US005718978A

United States Patent [19]
Yamashita et al.

[11] Patent Number: 5,718,978
[45] Date of Patent: Feb. 17, 1998

[54] MAGNETIC RECORDING MEDIUM HAVING A MAGNETIC LAYER WHICH INCLUDES MAGNETIC PARTICLES, POLURETHANE RESIN, VINYL CHLORIDE COPOLYMER, AND AN AMINE COMPOUND

[75] Inventors: Kazutaka Yamashita; Hidehiko Nakayama; Akira Ishikawa, all of Tochigi, Japan

[73] Assignee: Kao Corporation, Tokyo, Japan

[21] Appl. No.: 592,521

[22] Filed: Jan. 24, 1996

[30] Foreign Application Priority Data

Jan. 25, 1995 [JP] Japan ................................ 7-010199
Jan. 25, 1995 [JP] Japan ................................ 7-010201

[51] Int. Cl.$^6$ ................................................ G11B 5/702
[52] U.S. Cl. ............... 428/425.9; 428/522; 428/694 BU; 428/694 BG; 428/694 BY; 428/900; 427/128
[58] Field of Search ................... 428/425.9, 522, 428/694 BU, 694 BG, 694 BY, 900; 427/128

[56] References Cited

U.S. PATENT DOCUMENTS

| | | | |
|---|---|---|---|
| 4,405,684 | 9/1983 | Blumentritt et al. | 428/336 |
| 4,410,440 | 10/1983 | Ko | 252/62.54 |
| 4,567,096 | 1/1986 | Piltingsrud et al. | 428/315.9 |
| 4,596,739 | 6/1986 | Piltingsrud et al. | 428/315.9 |
| 5,278,275 | 1/1994 | Yatsuka et al. | 528/74 |

FOREIGN PATENT DOCUMENTS 0 075 083   3/1983   European Pat. Off. .

*Primary Examiner*—Stevan A. Resan
*Attorney, Agent, or Firm*—Oblon, Spivak, McClelland, Maier & Neustadt, P.C.

[57] ABSTRACT

The present invention provides a magnetic recording medium which allows high density recording and exhibits excellent output characteristics and durability. A novel magnetic recording medium comprising a support and a magnetic layer provided on said support is provided, characterized in that said magnetic layer is formed by a magnetic coating composition comprising:

(a) a polyurethane resin obtained by protecting isocyanate groups in an isocyanate terminated polyurethane prepolymer by an oxime compound; and (b) a compound containing one or more primary amino groups per molecule.

14 Claims, No Drawings

MAGNETIC RECORDING MEDIUM HAVING A MAGNETIC LAYER WHICH INCLUDES MAGNETIC PARTICLES, POLURETHANE RESIN, VINYL CHLORIDE COPOLYMER, AND AN AMINE COMPOUND

FIELD OF THE INVENTION

The present invention relates to a magnetic recording medium. More particularly, the present invention relates to a magnetic recording medium which allows high density recording and exhibits excellent output characteristics and durability.

BACKGROUND OF THE INVENTION

Magnetic recording media have been widely used in the form of tape, disc, sheet or the like. These magnetic recording media are normally prepared by applying a magnetic coating composition containing a magnetic powder and a binder as main components to a support such as polyester. In recent years, magnetic recording media having a smaller size as well as a higher recording density have been required. In order to meet these requirements, the enhancement of the coercive force or saturated magnetization of the magnetic powder and the reduction of the thickness of the magnetic layer have been proposed. In addition to these requirements, high quality magnetic recording media have been required. In order to meet such a requirement, a magnetic recording medium excellent particularly in output characteristics has been proposed.

In an attempt to provide the magnetic recording medium with a higher density and a higher output, the use of a magnetic powder having a smaller particle diameter has been proposed. In general, a magnetic powder is disperse and fixed in the magnetic layer with a binder containing polar groups in its molecule and having a number-average molecular weight of from 20,000 to 30,000. However, if such a binder is used to disperse and fix a finely divided magnetic powder, sufficient dispersibility of the magnetic powder can be hardly obtained.

In an attempt to assure the dispersibility of the magnetic powder, the reduction of the molecular weight of the binder has been commonly practiced. However, a polyisocyanate heretofore used to cure such a binder preferentially reacts with water present in the magnetic coating composition or the magnetic layer formed by the application of the magnetic coating composition. Thus, the polyisocyanate cannot thoroughly fulfil its function as a hardener. Accordingly, the durability of the conventional magnetic recording medium is not on the desired level. It has thus been desired to develop a magnetic recording medium having a better durability.

SUMMARY OF THE INVENTION

It is therefore an object of the invention to provide a magnetic recording medium which allows high density recording and exhibits excellent output characteristics and durability.

As a result of extensive studies, the inventors found that the incorporation of a curing system comprising a specific binary system in the magnetic coating composition for forming a magnetic layer provides enhancement of the dispersibility of the magnetic powder and the durability of the magnetic recording medium.

The present invention has been worked out on the basis of the above finding. The object of the present invention is accomplished with a magnetic recording medium comprising a support and a magnetic layer provided on said support, characterized in that said magnetic layer is formed by a magnetic coating composition comprising (a) a polyurethane resin obtained by protecting isocyanate groups in an isocyanate-terminated isocyanate prepolymer by an oxime compound, and (b) a compound containing one or more primary amino groups per molecule.

The magnetic recording medium of the present invention can be used mainly as a magnetic tape such as data storage magnetic tape, 8-mm video tape and DAT tape. It can also be used as a magnetic recording medium such as floppy disc.

DETAILED DESCRIPTION OF THE INVENTION

The magnetic recording medium of the present invention will be further described hereinafter.

As mentioned above, the magnetic recording medium of the present invention comprises a support and a magnetic layer provided on the support, characterized in that said magnetic layer comprises (a) a polyurethane resin obtained by protecting isocyanate groups in an isocyanate-terminated prepolymer (hereinafter referred to as polyurethane prepolymer) by an oxime compound, and (b) a compound containing one or more primary amino groups per molecule.

In other words, in the magnetic recording medium of the present invention, the magnetic coating composition for forming the magnetic layer comprises a curing system consisting essentially of a binary system, i.e., components (a) and (b). The components (a) and (b) will be further described hereinafter.

Firstly, the polyurethane resin obtained by protecting isocyanate group in a polyurethane prepolymer by an oxime compound (hereinafter referred to as "polyurethane resin"), which is used as the component (a), will be further described hereinafter.

Examples of the polyurethane resin include a resin containing not less than 2.1 oxime protected isocyanate groups (regenerable isocyanate group) per molecule on the average (hereinafter referred to as "polyurethane resin (I)"), and a resin containing not more than 2 oxime protected isocyanate groups per molecule (hereinafter referred to as "polyurethane resin (II)").

The polyurethane resin (I) is obtained by protecting terminal isocyanate groups in polyurethane prepolymer by an oxime compound. In some detail, the polyurethane resin can be obtained by a first process which comprises reacting a polyol component having a group containing not less than 2.1 active hydrogens on the average (e.g., a polyol having a valence of not less than 3 alone or a mixture thereof with glycol) with an isocyanate to obtain a polyurethane prepolymer, and by a second process of protecting isocyanate groups in the polyurethane prepolymer by the oxime compound.

The polyol having a valence of not less than 3 which constitutes the polyol component containing a group having not less than 2.1 active hydrogens on the average is not specifically limited. Examples of such a polyol include glycerine, pentaerythritol, ethylene oxide adduct of polyvalent alcohol such as glycerin (average number of added moles: 0.1 to 24), propylene oxide adduct of polyvalent alcohol such as glycerin (average number of added moles: 0.1 to 19), and polyhydroxyalkylamine such as diisopropanolamine, monoisopropanolamine, monoethanolamine, diethanolamine and triethanolamine. Examples of the glycol component include ethylene glycol, neopentyl glycol, 1,4-butanediol, spiroglycol, polyether compound obtained by the addition of propylene oxide or ethylene oxide to these glycols, and OH-terminated polyester synthesized from a dibasic acid such as adipic acid, succinic acid, maleic acid, isophthalic acid and naphthalenedicarboxylic acid and a glycol such as ethylene glycol, neopentyl glycol and 1,4-butanediol.

The hydroxyl number (OHV) of the polyol component is preferably from 50 to 2,000.

As the foregoing isocyanate there may be used an aliphatic isocyanate, aromatic isocyanate or alicyclic isocyanate.

Examples of the aliphatic isocyanate include 1,6-hexanediisocyanate. Examples of the aromatic isocyanate include tolylene diisocyanate, xylylene diisocyanate, tetramethylxylyene diisocyanate, naphthalene diisocyanate, diphenylsulfone diisocyanate, triphenylmethane diisocyanate, triphenylmethane triisocyanate, diphenylether-4,4'-diisocyanate, and diphenylmethane-4,4'-diisocyanate. Examples of the alicyclic isocyanate include isophorone diisocyanate, hydrogenated tolylene diisocyanate, and hydrogenated diphenylmethane diisocyanate. Preferred among these isocyanates is tolylene diisocyanate.

The polyurethane prepolymer can be obtained by the reaction of the isocyanate with the polyol. The reaction can take place under ordinary reaction conditions. In some detail, the reaction normally takes place at a raised temperature of from 50° C. to 100° C., preferably from 50° C. to 80° C., optionally in the presence of a catalyst such as dibutyl tin dilaurate. The termination of the reaction can be determined by measuring the content of an active hydrogen-containing group such as hydroxyl group by means of IR spectroscopy.

The polyurethane prepolymer must be terminated by isocyanate groups. In order to terminate the polyurethane prepolymer by isocyanate groups, the isocyanate and the compounds having a group containing active hydrogen such as polyol, polyester polyol and polyether polyol are preferably charged in a mixing molar ratio of from 2:1 to 61:60.

The polyurethane prepolymer has terminal isocyanate groups protected by an oxime compound. The stability of the magnetic coating composition can be maintained by means of protecting isocyanate groups. Examples of the oxime compound include formaldoxime, acetoaldoxime, acetoxime, methyl ethyl ketoxime, methyl isopropyl ketoxim, methyl butyl ketoxim, diethyl ketoxime, diacetyl monoxime, benzophenone oxime, and cyclohexanone oxime. Particularly preferred among these oxime compounds are methyl ethyl ketoxime and cyclohexanone oxime. These oxime compounds may be used singly or in combination.

In general, the protection of the isocyanate group in the polyurethane resin (I) is accomplished with an alcohol compound, acetylacetone, lactam compound, sulfite salt, heterocyclic compound or the like. These compounds are disadvantageous in that they harden slowly or exhibit a poor stability. Therefore, these compounds are not desirable for the protection of isocyanate groups in the component (a).

The protection of the isocyanate group by the oxime compound can be brought about by gradually adding the oxime compound to the polyurethane prepolymer in an active hydrogen-free organic solvent or in a non-solvent system. The reaction temperature is normally from about 40° C. to 100° C. The polyurethane prepolymer reacts with the oxim compound very fast. If necessary, the reaction may be accomplished in the presence of a catalyst such as tertiary amine, metal salt and organic metal compound. The protection of the isocyanate group by the oxime compound can be observed by the disappearance of peaks of IR spectrum of isocyanate group.

Under predetermined reaction conditions, the protected isocyanate group is regenerated to the isocyanate group which will then react with the component (b).

The polyurethane resin (I) preferably exhibits a number-average molecular weight of from 500 to 20,000, more preferably from 500 to 15,000.

The polyurethane resin (II) contains two or less oxime protected isocyanate groups per molecule. Such a polyurethane resin can be normally obtained by protecting a polyurethane prepolymer obtained by the reaction of an isocyanate compound with a compound having a group containing active hydrogen by an oxime compound.

As the isocyanate compound to be used to obtain the polyurethane resin (II) there may be properly used the same isocyanate compound as used to obtain the polyurethane resin (I).

Examples of the compound having a group containing active hydrogen include the above exemplified glycol components such as polyol, polyester polyol, and polyether polyol. However, the present invention is not limited to these compounds.

The reaction of the isocyanate compound with the compound having a group containing active hydrogens can take place under ordinary reaction conditions. In some detail, the reaction normally takes place at a raised temperature of from 50° C. to 100° C., preferably from 50° C. to 80° C., optionally in the presence of a catalyst such as dibutyl tin dilaurate. The termination of the reaction can be determined by titmetrical measurement of the content of NCO.

The polyurethane prepolymer thus obtained must have terminal NCO groups. In order to terminate the prepolymer by NCO groups, the isocyanate and the compound having a group containing active hydrogen such as polyol, polyester polyol and polyether polyol are preferably charged in a mixing molar ratio of from 2:1 to 61:60.

As the oxime compound to be used to protect the isocyanate group of the polyurethane prepolymer there may be properly used the same oxime compound as used to obtain the polyurethane resin (I).

The protection of the isocyanate group in the polyurethane resin (II) is normally accomplished also with an alcohol compound, acetylacetone, lactam compound, sulfite salt, heterocyclic compound or the like besides the oxime compound. However, these compounds are disadvantageous in that they harden slowly or exhibit a poor stability. Thus, these compounds are not desirable in the present invention.

The protection of the polyurethane prepolymer by the oxime compound can be accomplished by gradually adding the oxime compound to the polyurethane prepolymer in an active hydrogen-free organic solvent or in a non-solvent system so that the two components react with each other. The reaction temperature is normally from about 50° C. to 100° C. The isocyanate in the polyurethane prepolymer reacts with the oxime compound very fast. If necessary, the reaction may be effected in the presence of a catalyst such as tertiary amine, metal salt and organic metal compound. The protection of NCO groups by the oxime compound can be observed by the disappearance of peaks of IR spectrum of NCO group.

The polyurethane resin (II) thus obtained has one isocyanate group protected by the oxime compound preferably at both ends. Under predetermined reaction conditions, the protected isocyanate group is regenerated to the isocyanate group which will then react with the component (b).

As the polyurethane resin (II) there may be used a polyurethane resin containing two or less (preferably two, particularly one at each end) oxim protected isocyanate groups per molecule and preferably containing at least one group selected from the polar group consisting of sulfoxyl group, nitro group, carboxyl group and betaine structure in an amount of 0.3 or more on the number average per molecule.

The incorporation of the polar group in such an amount provides a higher dispersibility. The polyurethane resin (II) containing the group can be easily obtained by the use of the following compound.

For example, a compound obtained by protecting by the oxime compound a polyurethane prepolymer obtained by the reaction of a polyester polyol produced from a sulfonate-containing carboxylic acid (e.g., 5-sodiumsulfoisophthalic acid), a low molecular glycol (e.g., ethylene glycol, neopentyl glycol, 1,4-butaneglycol, 1,6-hexane glycol) and an isocyanate can be preferably used. As the salt of the sulfonate there may be preferably used an alkaline metal salt such as sodium salt and potassium salt.

The polyurethane resin (II) exhibits a number-average molecular weight of from 1,000 to 30,000, preferably from 3,000 to 30,000, more preferably from 5,000 to 25,000.

In a particularly preferred embodiment, the polyurethane resin (II) contains two or less (preferably two, particularly one at each end) oxime protected isocyanate groups per molecule and one or more groups selected from the polar group consisting of sulfoxyl group, nitro group, carboxyl group and betaine structure in an amount of 0.3 or more on the number average per molecule and thus exhibits a number-average molecular weight of from 1,000 to 30,000.

The amount of the polyurethane resin to be added can be properly controlled depending on the kind of the polyurethane resin. In particular, the amount of the polyurethane resin (I), if any, to be used is preferably from 3 to 15 parts by weight, particularly from 5 to 10 parts by weight based on 100 parts by weight of the magnetic powder used. Further, the amount of the polyurethane resin (II), if any, to be used is preferably from 3 to 15 parts by weight, particularly from 5 to 10 parts by weight based on 100 parts by weight of the magnetic powder used.

As the polyurethane resin there may also be used a mixture of the polyurethane resins (I) and (II). In this case, the content of the polyurethane resin (I) is preferably not less than 1% by weight, more preferably from 3 to 80% by weight, most preferably from 5 to 50% by weight based on the total weight of the polyurethane resin incorporated in the magnetic coating composition. If the polyurethane resin (I) is incorporated in an amount of not less than 1% by weight, the stability of the magnetic coating composition can be maintained as desired, advantageously resulting in the enhancement of the dispersibility of the magnetic powder.

The polyurethane resins (I) and (II) may be used in admixture with other types of polyurethane resins.

The compound containing one or more primary amino groups per molecule (hereinafter referred to as "amino-containing compound"), which is the component (b), will be further described hereinafter.

The amino-containing compound is a hardener which reacts with an oxime protected isocyanate group incorporated in the polyurethane resin as component (a) to cure the component (a).

The amino-containing compound is not specifically limited so far as it contains one or more primary amino groups per molecule. Examples of the primary amino-containing compound include amines such as aliphatic primary amine, aliphatic unsaturated amine, alicyclic amine and aromatic amine. These amines may contain an alkoxy group, an alcohol group or a cyclic amino group such as imidazolyl group instead of hydrocarbon group.

Specific examples of the amino-containing compound having one or more primary amino groups per molecule include ethylenediamine, diethylenetriamine, triethylenetetramine, tetraethylenepentamine, pentaethylenehexamine, xylylenediamine such as m-xylylenediamine, hexamethylenediamine, 1,4-diaminobutane, 1,2-diaminopropane, 2-hydroxyethylaminopropylamine, monoethanolamine, monoisopropanolamine, 4,4'-methylenebis (cyclohexylamine), 3-aminomethyl-3,5,5-trimethylcyclohexylamine, polyoxypropylene diamine, polyoxypropylenetriamine, polyoxyethylenediamine, polyoxyethylenetriamine, bis(aminomethyl)cyclohexane, EO.PO-block polymer polyether amine, polyoxypropylenediurea, polypropylene glycol amino alkyl ether, allylamine, isopropylamine, 3,3-iminobis (propylamine), ethylamine, 3(2-ethylhexyloxy) propylamine, 3(dibutylamino)propylamine, 3,9-bis(3-aminopropyl)-2,4,8,10-tetraoxaspiro-[5.5]-undecane, and γ-aminopropyltriethoxysilane.

Particularly preferred among these amino-containing compounds are ethylenediamine, polyoxypropylenediamine, polyoxypropylenetriamine, and polyoxypropylenediurea.

The foregoing amino-containing compounds may be used singly or in combination.

The incorporation of the amino-containing compound having a primary amino group together with the component (a) in the magnetic coating composition according to the present invention causes the dissociation of oxime protected isocyanates from the component (a) so that the isocyanate in the component (a) and the primary amino group react with each other to cause the crosslinking of polyurethane on the coating film, making it possible to provide a magnetic recording medium which allows high density recording and exhibits excellent output characteristics and durability. In other words, the compound containing a primary amino group serves as a component of the binder which contributes to the enhancement of the strength of the coating film. The curing of the coating film may be carried out at a temperature of from 50° C. to 90° C., preferably from 50° C. to 80° C., at which the base film or magnetic layer undergoes no deformation or heat histerisis.

Thus, the present invention provides a process for the preparation of a magnetic recording medium, which comprises applying to a support a magnetic coating composition comprising (a) a polyurethane resin obtained by protecting isocyanate groups in an isocyanate-terminated polyurethane prepolymer by an oxime compound, and (b) a compound containing one or more primary amino groups per molecule, drying the coated material, and then heat-curing the coated material at a temperature of from 50° C. to 90° C., preferably from 50° C. to 80° C.

The content of the amino-containing compound is preferably from 0.1 to 20 parts by weight, particularly from 0.5 to 10 parts by weight based on 100 parts by weight of the content of the component (a) or the sum of the content of the component (a) and the content of a component (c) to be optionally used. If the content of the amino-containing compound falls below 0.1 parts by weight, curing reaction cannot proceed thoroughly. On the contrary, if the content of the foregoing amino-containing compound exceeds 20 parts by weight, unreacted amino-containing compounds are left. Thus, the above defined range is preferred.

Further, the magnetic coating composition may preferably comprise a copolymer containing as a main component a vinyl chloride and having two or more epoxy groups per molecule (hereinafter referred to as "copolymer") as component (c) in addition to the foregoing components (a) and (b).

The foregoing copolymer is a component to be incorporated in the magnetic coating composition to enhance the strength of the coating film formed by the magnetic coating composition. The copolymer is not specifically limited in its form so far as it is a copolymer having two or more epoxy groups produced from vinyl chloride and other copolymerizable components. Any of random copolymer, protect copolymer, alternating copolymer and graft copolymer may be used.

Examples of the copolymerizable components include hydroxy methacrylate, methyl methacrylate and epoxy-containing compounds such as glycidyl methacrylate and glycidyl acrylate. In order to introduce an epoxy group into the copolymer, the epoxy-containing compound is preferably applied to react with vinyl chloride. In this case, too, components other than the epoxy-containing compound may be used.

These copolymerizable components may be used singly or in combination.

As mentioned above, the copolymer comprises vinyl chloride as a main component. In particular, the molar ratio of vinyl chloride to the other copolymerizable components (vinyl chloride/copolymerizable components) in the copolymer is preferably from 97/3 to 60/40, more preferably 95/5 to 70/30. In other words, the copolymer is preferably obtained by polymerizing the vinyl chloride and the copolymerizable component in the foregoing molar ratio. Further, the copolymerizable component preferably comprises the epoxy-containing compound incorporated therein in such an amount that the number of epoxy groups incorporated in the copolymer thus obtained is 2 or more.

Particularly preferred examples of the copolymer include MR Series such as MR104 and MR105 available from Nippon Zeon Co., Ltd.

The content of the component (c), if any, is preferably from 3 to 20 parts by weight, particularly from 5 to 15 parts by weight based on 100 parts by weight of the magnetic powder used.

As mentioned above, the magnetic coating composition comprises the components (a) and (b), and optionally the component (c). In addition to these components, the magnetic coating composition comprises a magnetic powder incorporated therein. Examples of such a magnetic powder include ferromagnetic iron oxide powder, ferromagnetic chromium dioxide powder, and ferromagnetic metal powder.

As the ferromagnetic iron oxide there may be used $FeO_x$ ($1.33 \leq x \leq 1.5$) comprising a metal such as Cr, Mn, Co and Ni incorporated therein.

As the ferromagnetic chromium dioxide there may be used $CrO_2$ or $CrO_2$ comprising a metal such as Na, K, Fe, In and Mn, oxide thereof or non-metallic element such as P incorporated therein.

As the foregoing ferromagnetic metal powder there may be used a ferromagnetic metal powder having a metal content of not less than 50% by weight, said metal content comprising at least one ferromagnetic metal (e.g., Fe, Co, Ni) in a proportion of not less than 60% by weight. Specific examples of the ferromagnetic metal include Fe—Co, Fe—Ni, Fe—Al, Fe—Ni—Al, Co—Ni, Fe—Co—Ni, Fe—Ni—Al—Zn, and Fe—Al—Si.

The magnetic powder may comprise a rare earth element or transition metal element incorporated therein if necessary.

As the magnetic powder there may be used a microtabular barium ferrite or a magnetic powder obtained by replacing some of Fe atoms in the ferrite by an atom such as Ti, Co, Ni, Zn and V.

The magnetic powder may be subjected to surface treatment to enhance the dispersibility thereof.

The magnetic coating composition comprises a solvent. Examples of such a solvent include ketone solvent, ester solvent, ether solvent, aromatic hydrocarbon solvent, and chlorinated hydrocarbon solvent. In particular, solvents described in JP-A-57-162128, line 17, lower right column, page 3—line 10, upper left column, page 4, may be used. The solvent may be used in an amount of from about 10 to 1,200 parts by weight, particularly from 15 to 800 parts by weight based on 100 parts by weight of the magnetic powder.

The magnetic coating composition may comprise additives commonly used for magnetic coating composition such as binder and various additives incorporated therein. Examples of such additives include dispersant, lubricant, abrasive, antistatic agent, corrosion inhibitor, antifungal agent, and hardener. Specific examples of these additives include various additives described in JP-A-57-162128, line 6, upper left column, page 2—line 10, upper right column, page 2, and line 6, upper left column, page 3—line 18, upper right column, page 3.

The preparation of the magnetic coating composition can be accomplished, e.g., by a process which comprises charging the component (a), optionally the component (c), and carbon, abrasive, and magnetic powder with a part of a solvent to be used into a Naughter mixer or the like, stirring these materials to obtain a mixture, kneading the mixture by means of a continuous pressure kneader or the like, diluting the mixture with another part of the solvent, subjecting the mixture to dispersion by means of a sand mill or the like, adding an additive such as lubricant to the dispersion, filtering the dispersion to obtain an agent A, and then mixing the agent A with an agent B comprising a component (b) which has been separately prepared and the remainder of the solvent. An effective preparation method will be further described with reference to the process for the preparation of a magnetic recording medium later.

The magnetic layer formed from the magnetic coating composition can comprise a magnetic powder in combination with the components (a) and (b), and optionally the component (c) to enhance the dispersibility of the magnetic powder as well as the durability of the magnetic layer.

In the magnetic recording medium of the present invention, the dried thickness of the magnetic layer formed by the magnetic coating composition is preferably from 0.05 to 5 µm, more preferably from 0.05 to 3.0 µm.

The support on which the magnetic layer is to be provided will be further described hereinafter.

As the support there may be used a known magnetic or non-magnetic support without any restriction. In particular, a film formed by a known resin such as polyethylene terephthalate, polyethylene naphthalate, polyphenylene sulfide, polyaramide, polycarbonate, polyamide, polyimide, polyamideimide and polysulfone; glass; thin aluminum film; etc. may be used. The support may be subjected to corona discharge treatment, plasma treatment, treatment for higher adhesivity, heat treatment, dust-resistant finish or the like prior to the formation of a magnetic layer thereon. The preferred thickness of the support is from 1 to 300 μm.

As mentioned above, the magnetic recording medium of the present invention comprises a support and a magnetic layer provided on the support. In addition to these components, the magnetic recording medium of the present invention may comprise further layers. These additive layers include a non-magnetic layer and other magnetic layers (soft magnetic layer) provided between the support and the magnetic layer, and backcoat layer provided on the other side of the support (opposite the magnetic layer). In the present invention, these layers, too, may comprise a curing system comprising a binary system made of the components (a) and (b), preferably a ternary system made of the components (a), (b) and (c). In some detail, such a curing system may be incorporated in a magnetic recording medium having a combination of magnetic layer/magnetic layer, a magnetic recording medium having a magnetic layer/non-magnetic layer, or a magnetic recording medium having a backcoat layer, or in a magnetic recording medium having an arbitrary combination of these layers.

The backcoat layer will be summarily described hereinafter.

The backcoat layer may be formed by applying a backcoat composition to a support. The backcoat composition can be obtained by properly mixing a non-magnetic powder such as carbon black, titanium oxide, barium sulfate and calcium carbonate, a binder such as vinyl chloride resin, polyester, polyurethane, nitrocellulose and epoxy resin, a dispersant, a lubricant, a hardener, a solvent, etc. Further, the backcoat composition may comprise a polyurethane resin [either or both of polyurethane resin (I) and polyurethane resin (II)] incorporated therein. The backcoat composition can be normally prepared in the same manner as known backcoat composition.

The outline of the process for the preparation of the magnetic recording medium of the present invention will be described hereinafter.

The magnetic coating composition is applied to the support. The coated amount of the magnetic coating composition is such that the dried thickness of the magnetic layer is in the above mentioned preferred range. In the case where the non-magnetic layer is provided in addition to the magnetic layer, the non-magnetic coating composition and the magnetic coating composition are simultaneously applied to the support in a wet-on-wet process to the respective dried thickness to form a non-magnetic coating film and a magnetic coating film, respectively. The magnetic powder in the coating film is oriented in a magnetic field. The coated material is dried, and then wound. Thereafter, the coated material is optionally calendered, optionally followed by the formation of a backcoat layer. Subsequently, the coated material, if used as a magnetic tape, is cured at a temperature of from 50° C. to 70° C. for from 10 to 72 hours if necessary, and then slit into a desired width.

The simultaneous multi-layer coating method is described in JP-A-5-73883, line 31, 42nd column—line 31, 43rd column. This method is characterized by the application of the magnetic coating composition for forming the magnetic layer before the non-magnetic coating composition for forming the non-magnetic layer is dried. In accordance with this simultaneous multi-layer coating method, a smooth interface can be provided between the non-magnetic layer and the magnetic layer. At the same time, the magnetic layer can be provided with good surface properties.

The magnetic orientation is conducted before the magnetic coating film is dried. For example, if the magnetic recording medium of the present invention is a magnetic tape, a magnetic field of not less than about 5000 Oe, preferably from about 1,000 to 10,0000 Oe may be applied in parallel to the surface of the first magnetic coating film. Alternatively, the magnetic recording medium may be passed through a solenoid of from 1,000 to 10,000 Oe while the magnetic coating film is wet.

The foregoing drying of the coated material can be accomplished by supplying a gas which has been heated to a temperature of from 30° C. to 120° C. Drying degree can be controlled by adjusting the temperature of the gas and the feed rate of the gas.

The foregoing calendering of the coated material can be accomplished by a supercalendering process which comprises passing the coated material between two rolls such as metal roll, cotton roll, synthetic resin roll and metal roll. The calendering can be conducted at a temperature of from 60° C. to 140° C. under a pressure of from 100 to 500 kg/cm.

The magnetic coating composition is applied to the support shortly after or 0.1 to 3,600 seconds after the mixing of the agents A and B. The two agents is preferably mixed at ordinary temperatures by means of an in-line mixer.

The coating speed of the magnetic coating composition is preferably from 100 to 500 m/min.

In the preparation of the magnetic recording medium of the present invention, the surface of the magnetic layer can be finished by polishing, cleaning or the like. The application of the non-magnetic and magnetic coating compositions can be also accomplished by a known successive multi-layer coating method.

The present invention will be further described in the following examples and comparative examples, but the present invention should not be construed as being limited thereto. The term "parts" as used herein is meant to indicate "parts by weight".

PREPARATION EXAMPLE 1

Synthesis of polyurethane resin (A)

Into a reaction vessel equipped with a thermometer, a stirrer and a condenser were charged 920 g of glycerin and 1 g of sodium hydroxide. 9,200 g of ethylene oxide were then introduced to the reaction mixture at a temperature of 60° C. in 3 hours. The reaction mixture was then allowed to be kept at a temperature of 60° C. for 2 hours. The reaction mixture was then neutralized with phosphoric acid. The resulting precipitate was then filtered to obtain a polyol (i) having OHV of 170.

Subsequently, 1,000 g of the polyol (i) thus obtained, 530 g of tolylene diisocyanate and 1,000 g of methyl ethyl ketone were charged into a reaction vessel. The mixture was then allowed to undergo reaction at a temperature of 60° C. to 80° C. for 10 hours. 265 g of methyl ethyl ketoxime were then added dropwise to the reaction mixture in 1 hour. The reaction mixture was then maintained at a temperature of 60° C. to 80° C. for 1 hour. After the complete disappearance of NCO group was confirmed, the reaction was terminated. As a result, an oxime protected polyurethane resin (A) [polyurethane resin (I)] having a number-average molecular weight Mn of 1,750 [in polystyrene equivalence as determined by gel permeation chromatography (hereinafter referred to as "GPC")] and a regenerable isocyanate group content of 7.0% by weight was obtained.

PREPARATION EXAMPLE 2

Synthesis of polylurethane (D-1) to (D-3)

Into a reaction vessel equipped with a thermometer, a stirrer and a condenser were charged 2,300 g of methyl ethyl ketone, 770 g of a polyester as described later and 603 g of diphenylmethane-4,4'-diisocyanate. The mixture was then allowed to undergo addition reaction at a temperature of 70° C. to 80° C. for 5 hours. To the reaction mixture were then added 47.7 g of ethylene glycol, 80 g of neopentyl glycol and 0.2 g of dibutyl tin dilaurate. The reaction mixture was then maintained at a temperature of 70° C. to 80° C. for 10 hours.

Subsequently, 18 g of methyl ethyl ketoxim was added dropwise to the reaction mixture in 1 hour. The reaction mixture was then kept at a temperature of 65° C. to 75° C. for 1 hour. As a result, the isocyanate group disappeared completely. Thus, a polyurethane resin (D-2) having a regenerable isocyanate group content of 0.56% by weight and containing 1.0 sulfoxyl group per molecule and a protected isocyanate group having Mn of 15,000 was obtained.

A polyurethane resin (D-1) containing 0.7 sulfoxyl groups per molecule and protected isocyanate groups having Mn of 10,000 was obtained in the same synthesis method as the polyurethane resin (D-2) except that the charged amount of diphenylmethane-4,4'-diisocyanate and methyl ethyl ketoxim were 618 g and 27 g, respectively. Further, a polyurethane resin (D-3) containing 2.0 sulfoxyl groups per molecule and protected isocyanate groups having Mn of 30,000 was obtained in the same synthesis method as the polyurethane resin (D-2) except that the charged amount of diphenylmethane-4,4'-diisocyanate and methyl ethyl ketoxim were 590 g and 10 g, respectively.

The foregoing polyester had been synthesized in the following manner.

Into a reaction vessel equipped with a thermometer, a stirrer and a partial reflux condenser were charged 79 parts of dimethyl terephthalate, 59 parts of dimethyl isophthalate, 9 parts of dimethyl 5-sodiumsulfoisophthalate, 87 parts of ethylene glycol, 73 parts of neopentyl glycol, 0.2 parts of zinc acetate, 0.02 parts of sodium acetate and 0.2 parts of antimony trioxide. The mixture was then allowed to undergo ester interchange reaction at a temperature of 150° C. to 210° C. for 3 hours. To the reaction mixture were then added 39 parts of adipic acid. The mixture was then kept at a temperature of from 190° C. to 240° C. for 1 hour. The pressure of the reaction system was then reduced to 5 to 50 mmHg in 30 minutes. The reaction mixture was then allowed to undergo polycondensation reaction until a polyester of OHV of 110 is obtained. NMR analysis of the resulting polyester showed that the product has the following composition:

|  | Molar ratio |
| --- | --- |
| Terephthalic acid | 40 |
| Isophthalic acid | 30 |
| Adipic acid | 27 |
| 5-Sodiumsulfoisophthalic acid | 3 |
| Ethylene glycol | 50 |
| Neopentyl glycol | 50 |

COMPARATIVE PREPARATION EXAMPLE 1

Synthesis of polyurethane (D-4) to (D-6)

Into a reaction vessel equipped with a thermometer, a stirrer and a condenser were charged 2,300 g of methyl ethyl ketone, 796 g of the polyester synthesized as described above and 572 g of diphenylmethane-4,4'-diisocyanate. The mixture was then allowed to undergo addition reaction at a temperature of 70° C. to 80° C. for 5 hours. To the reaction mixture were then added 49.4 g of ethylene glycol, 82.8 g of neopentyl glycol and 0.2 g of dibutyl tin dilaurate. The reaction mixture was then maintained at a temperature of 70° C. to 80° C. for 10 hours. Thus, a polyurethane resin (D-5) containing 1.0 sulfoxyl group per molecule and having Mn of 15,000 as determined by GPC was obtained.

A polyurethane resin (D-4) containing 0.7 sulfoxyl groups per molecule and having Mn of 10,000 was obtained in the same synthesis method as the polyurethane resin (D-5) except that the charged amount of diphenylmethane-4,4'-diisocyanate was 586 g. Further, a polyurethane resin (D-6) containing 2.0 sulfoxyl groups per molecule and having Mn of 30,000 was obtained in the same synthesis method as the polyurethane resin (D-5) except that the charged amount of diphenylmethane-4,4'-diisocyanate was 560 g.

The polyurethane resins (D-4) to (D-6) have terminal hydroxyl groups and no terminal isocyanate group.

EXAMPLE 1

A magnetic coating composition was prepared in accordance with the following formulation. In some detail, among the following components except stearic acid and 2-ethylhexyl oleate were charged into a Naughter mixer with a part of the solvent (10 parts of methyl ethyl ketone; 10 parts of toluene; 10 parts of cyclohexane). The mixture was then stirred. The mixture thus obtained was then kneaded by means of a continuous pressure kneader. The mixture was diluted with another part of the solvent, and then subjected to milling process by means of a sand mill. The dispersion was mixed with stearic acid and 2-ethylhexyl oleate. The dispersion was then filtered to obtain an agent A. An agent B comprising the remainder of the solvent and a polyoxypropylenediamine (number-average molecular weight≈230; average added number of moles≈2.6) was then added to the agent A. The mixture was stirred by means of an in-line mixer to obtain the desired magnetic coating composition.

|  | Parts by weight |
| --- | --- |
| Agent A | |
| Acicular magnetic metal powder mainly composed of iron (BET: 50m$^2$/g; coercive force: 1,8600 e; saturated magnetization: 137 emu/g; average major axis length: 0.1 μm) | 100 |
| Alumina (average particle diameter: 0.3 μm) | 5 |
| Carbon black (average primary particle diameter: 20 nm) | 0.5 |
| MR104 [component (c)](epoxy group-containing vinyl chloride resin, available from Nippon Zeon Co., Ltd.; content of epoxy group: 13/mol) | 9 |
| Polyurethane resin A (polyuethane resin (I) as component (a)) | 1 |
| Polyurethane resin (D-1) (polyurethane resin (II) as component (a)) | 6 |
| Stearic acid | 1.5 |

-continued

| | Parts by weight |
|---|---|
| 2-Ethylhexyl oleate | 2 |
| Methyl ethyl ketone | 70 |
| Toluene | 70 |
| Cyclohexanone | 70 |
| Agent B | |
| Polyoxypropylenediamine (component (b)) (number-average molecular weight = 230; p ≈ 2.6) | 0.5 |
| Methyl ethyl ketone | 5 |
| Toluene | 5 |
| Cyclohexanone | 5 |

The magnetic coating composition thus obtained was applied to the surface of a PET support 5 seconds after the preparation of the composition with a dried thickness of 2.0 μm. The coated web was then passed through a solenoid of 5,000 Oe while the coating film was wet so that it was oriented in a magnetic field. The coated web thus oriented was dried at a temperature of 80° C., and then wound up. The coated material was then calendered at a temperature of 85° C. under a pressure of 350 kg/cm to form a magnetic layer. A backcoat composition described later was then applied to the other side of the support with a dried thickness of 0.5 μm. The coated material was dried at a temperature of 90° C., and then wound up. Thereafter, the coated material was cured at a temperature of 50° C. for 16 hours, and then slit into 3.81 mm wide strips to obtain a magnetic tape. The resulting magnetic tape was loaded into a DDS (Digital Data Storage using DAT system) cassette case to prepare a DDS cassette to be tested.

The backcoat composition had the following formulation:

| | Parts by weight |
|---|---|
| Carbon black (average primary particle diameter: 0.028 μm) | 32 |
| Carbon black (average primary grain diameter: 0.062 μm) | 8 |
| Nippolan 2301 (Tradename, polyurethane available from Nippon Polyurethane Industry Co., Ltd.) | 50 |
| Nitrocellulose (available from Hercules Powder Co., Ltd.; viscosity (label): ½ sec.) | 20 |
| D-250N (polyisocyanate, available from Takeda Chemical Industries, Ltd.) | 4 |
| Copper phthalocyanine | 5 |
| Stearic acid | 1 |
| Methyl ethyl ketone | 120 |
| Toluene | 120 |
| Cyclohexanone | 120 |

The magnetic tape thus obtained was then subjected to measurement of output at 4.7 MHz and durability in a still mode in accordance with the following methods. The results are summarized in Table 1.

Output (4.7 MHz)

The DDS tape cassette thus obtained was then loaded into a DDS drive connected to Tape Evaluator Model 4500 (Tradename, tester available from Media Logic). In this arrangement, a 4.7 MHz signal was then recorded on the magnetic tape. The output of the signal reproduced from the magnetic tape was then measured. The recorded wavelength of the 4.7 MHz signal was 0.67 μm.

Durability in a still mode

A DDS drive was modified to measure recording and reproducing characteristics in a still mode.

By using this modified drive, a signal of wavelength of 0.67 μm was recorded on the magnetic tape in a still mode. The time required until the reproduced output in a still mode reached 80% of the initial value was then measured.

EXAMPLE 2

A magnetic tape was obtained in the same manner as in Example 1 except that as the components (a) and (b) constituting the magnetic coating composition there were used resins and compounds set forth in Table 1 in accordance with the formulation set forth in Table 1. The magnetic tape thus obtained was then subjected to measurements of output and durability in a still mode in the same manner as in Example 1. The results are set forth in Table 1.

EXAMPLE 3

A magnetic tape was obtained in the same manner as in Example 1 except that as the components (a) and (b) constituting the magnetic coating composition there were used resins and compounds set forth in Table 1 in accordance with the formulation set forth in Table 1. The magnetic tape thus obtained was then subjected to measurements of output and durability in a still mode in the same manner as in Example 1. The results are set forth in Table 1.

COMPARATIVE EXAMPLE 1

A magnetic tape was obtained in the same manner as in Example 1 except that the components (a) and (b) were not used and 7 parts by weight of the polyurethane resin (D-5) and 4 parts by weight of Coronate L (Tradename, polyisocyanate available from Nippon Polyurethane Industry Co., Ltd.) were used. The magnetic tape thus obtained was then subjected to measurements of output and durability in a still mode in the same manner as in Example 1. The results are set forth in Table 1.

COMPARATIVE EXAMPLE 2

A magnetic tape was obtained in the same manner as in Example 1 except that the component (b) was not used, a resin set forth in Table 1 was used as the component (a) in accordance with the formulation set forth in Table 1, and 10 parts by weight of the polyurethane resin (D-6) and 4 part by weight of Coronate L were used. The magnetic tape thus obtained was then subjected to measurements of output and durability in a still mode in the same manner as in Example 1. The results are set forth in Table 1.

COMPARATIVE EXAMPLE 3

A magnetic tape was obtained in the same manner as in Example 1 except that the component (b) was not used, a resin set forth in Table 1 was used as the component (a) in accordance with the formulation set forth in Table 1, and 4 parts by weight of Coronate L were used. The magnetic tape thus obtained was then subjected to measurements of output and durability in a still mode in the same manner as in Example 1. The results are set forth in Table 1.

COMPARATIVE EXAMPLE 4

A magnetic tape was obtained in the same manner as in Example 1 except that the component (a) was not used, a resin set forth in Table 1 was used as the component (b) in accordance with the formulation set forth in Table 1, and 7 parts by weight of the polyurethane resin (D-4) were used. The magnetic tape thus obtained was then subjected to measurements of output and durability in a still mode in the same manner as in Example 1. The results are set forth in Table 1.

COMPARATIVE EXAMPLE 5

A magnetic tape was obtained in the same manner as in Example 1 except that the component (a) was not used, a resin set forth in Table 1 was used as the component (b) in accordance with the formulation set forth in Table 1, and 7 parts by weight of the polyurethane resin (D-5) were used. The magnetic tape thus obtained was then subjected to measurements of output and durability in a still mode in the same manner as in Example 1. The results are set forth in Table 1.

COMPARATIVE EXAMPLE 6

A magnetic tape was obtained in the same manner as in Example 1 except that the component (a) was not used, a resin set forth in Table 1 was used as the component (b) in accordance with the formulation set forth in Table 1, and 7 parts by weight of the polyurethane resin (D-6) were used. The magnetic tape thus obtained was then subjected to measurements of output and durability in a still mode in the same manner as in Example 1. The results are set forth in Table 1.

EXAMPLE 4

A magnetic coating composition was prepared in accordance with the following formulation. In some detail, among the following components except stearic acid and 2-ethylhexyl oleate were charged into a Naughter mixer with a part of the solvent (10 parts of methyl ethyl ketone; 10 parts of toluene; 10 parts of cyclohexane). The mixture was then stirred. The mixture thus obtained was then kneaded by means of a continuous pressure kneader. The mixture was diluted with another part of the solvent, and then subjected to milling process by means of a sand mill. The dispersion was mixed with stearic acid and 2-ethylhexyl oleate. The dispersion was then filtered to obtain an agent A. An agent B comprising the remainder of the solvent and ethylenediamine was then added to the agent A. The mixture was stirred by means of an in-line mixer to obtain the desired magnetic coating composition.

|  | Parts by weight |
|---|---|
| Agent A | |
| Acicular magnetic metal powder mainly composed of iron (BET: 50m²/g; coercive force: 1,8600 e; saturated magnetization: 137 emu/g; average major axis length: 0.1 μm) | 100 |
| Alumina (average particle diameter: 0.3 μm) | 5 |
| Carbon black (average primary particle diameter: 20 nm) | 0.5 |
| MR104 [component (c)](epoxy group-containing vinyl chloride resin, available from Nippon Zeon Co., Ltd.; content of epoxy group: 13/mol) | 9 |
| Polyurethane resin (D-1) (polyurethane resin (II) as component (a)) | 7 |
| Stearic acid | 1.5 |
| 2-Ethylhexyl oleate | 2 |

-continued

|  | Parts by weight |
|---|---|
| Methyl ethyl ketone | 70 |
| Toluene | 70 |
| Cyclohexanone | 70 |
| Agent B | |
| Ethylenediamine (component (b)) | 0.2 |
| Methyl ethyl ketone | 5 |
| Toluene | 5 |
| Cyclohexanone | 5 |

A magnetic tape was then obtained in the same manner as in Example 1 except that the magnetic coating composition thus obtained was used. The magnetic tape thus obtained was then subjected to measurements of output at 4.7 MHz and durability in a still mode in the same manner as in Example 1. The results are set forth in Table 2.

EXAMPLE 5

A magnetic tape was obtained in the same manner as in Example 4 except that as the components (a) and (b) constituting the magnetic coating composition there were used resins and compounds set forth in Table 2 in accordance with the formulation set forth in Table 2. The magnetic tape thus obtained was then subjected to measurements of output and durability in a still mode in the same manner as in Example 1. The results are set forth in Table 2.

EXAMPLE 6

A magnetic tape was obtained in the same manner as in Example 4 except that as the components (a) and (b) constituting the magnetic coating composition there were used resins and compounds set forth in Table 2 in accordance with the formulation set forth in Table 2. The magnetic tape thus obtained was then subjected to measurements of output and durability in a still mode in the same manner as in Example 1. The results are set forth in Table 2.

COMPARATIVE EXAMPLE 7

A magnetic tape was obtained in the same manner as in Example 4 except that the components (a) and (b) were not used and 7 parts by weight of the polyurethane resin (D-5) and 4 parts by weight of Coronate L were used. The magnetic tape thus obtained was then subjected to measurements of output and durability in a still mode in the same manner as in Example 1. The results are set forth in Table 2.

COMPARATIVE EXAMPLE 8

A magnetic tape was obtained in the same manner as in Example 4 except that the component (b) was not used, a resin set forth in Table 2 was used as the component (a) in accordance with the formulation set forth in Table 2, and 4 parts by weight of Coronate L were used. The magnetic tape thus obtained was then subjected to measurements of output and durability in a still mode in the same manner as in Example 1. The results are set forth in Table 1.

COMPARATIVE EXAMPLE 9

A magnetic tape was obtained in the same manner as in Example 4 except that the components (a) and (b) were not used, and 7 parts by weight of the polyurethane resin (D-6) and 4 parts by weight of Coronate L were used. The magnetic tape thus obtained was then subjected to measurements of output and durability in a still mode in the same manner as in Example 1. The results are set forth in Table 1.

COMPARATIVE EXAMPLE 10

A magnetic tape was obtained in the same manner as in Example 1 except that the component (a) was not used, a resin set forth in Table 2 was used as the component (b) in accordance with the formulation set forth in Table 2, and 7 parts by weight of the polyurethane resin (D-4) were used. The magnetic tape thus obtained was then subjected to measurements of output and durability in a still mode in the same manner as in Example 1. The results are set forth in Table 1.

COMPARATIVE EXAMPLE 11

A magnetic tape was obtained in the same manner as in Example 4 except that the component (a) was not used, a resin set forth in Table 2 was used as the component (b) in accordance with the formulation set forth in Table 2, and 7 parts by weight of the polyurethane resin (D-6) were used. The magnetic tape thus obtained was then subjected to measurements of output and durability in a still mode in the same manner as in Example 1. The results are set forth in Table 1.

TABLE 1

| | Formulation of curing system in magnetic coating composition | | | | | | Output (dB) | Still durability (min.) |
|---|---|---|---|---|---|---|---|---|
| | Component (a) | | Component (b) | | Other components | | | |
| Example No. | Kind | Wt. parts | Kind | Wt. parts | Kind | Wt. parts | | |
| Example | | | | | | | | |
| 1 | A<br>D-1 | 1<br>6 | PPDA | 0.5 | — | — | +1.2 | >300 |
| 2 | A<br>D-3 | 3<br>4 | EDA | 0.3 | — | — | +0.8 | >300 |
| 3 | A<br>D-2 | 4<br>3 | PPTA | 0.5 | — | — | +0.5 | >300 |
| Comparative Example | | | | | | | | |
| 1 | — | — | — | — | D-5<br>C-L | 7<br>4 | 0 | 100 |
| 2 | A | 3 | — | — | D-6<br>C-L | 10<br>4 | −0.3 | 60 |
| 3 | A<br>D-2 | 1<br>6 | — | — | C-L | 4 | −0.5 | 90 |
| 4 | — | — | PPDA | 0.2 | D-4 | 7 | −0.4 | 30 |
| 5 | — | — | EDA | 2 | D-5 | 7 | −0.8 | 10 |
| 6 | — | — | EDA | 4 | D-6 | 7 | −1.0 | 70 |

PPDA: Polyoxypropylenediamine (number-average molecular weight ≈ 230; p ≈ 2.6)
PPTA: Polyoxypropylenetriamine (number-average molecular weight ≈ 403; p ≈ 5.3)
EDA: Ethylenediamine
C-L: Coronate L

TABLE 2

| | Formulation of curing system in magnetic coating composition | | | | | | Output (dB) | Still durability (min.) |
|---|---|---|---|---|---|---|---|---|
| | Component (a) | | Component (b) | | Other components | | | |
| Example No. | Kind | Wt. parts | Kind | Wt. parts | Kind | Wt. parts | | |
| Example | | | | | | | | |
| 4 | D-1 | 7 | EDA | 0.2 | — | — | +1.0 | >300 |
| 5 | D-2 | 7 | EDA | 0.2 | — | — | +0.7 | >300 |
| 6 | D-3 | 7 | EDA | 0.2 | — | — | +0.2 | >300 |
| Comparative Example | | | | | | | | |
| 7 | — | — | — | — | D-5<br>C-L | 7<br>4 | 0 | 100 |
| 8 | D-1 | 7 | — | — | C-L | 4 | +0.1 | 80 |
| 9 | — | — | — | — | D-6<br>C-L | 7<br>4 | −0.5 | 120 |
| 10 | — | — | EDA | 0.2 | D-4 | 7 | −0.1 | 30 |
| 11 | — | — | EDA | 0.2 | D-6 | 7 | −0.3 | 50 |

EDA: Ethylenediamine
C-L: Coronate L

It can be seen in Tables 1 and 2 that the magnetic recording media of the present invention having a magnetic layer formed by the magnetic coating composition containing the foregoing components (a) and (b) (Examples 1 to 6) exhibit a high output as well as an extremely excellent durability in a still mode.

On the contrary, the magnetic recording media having a magnetic layer formed by the magnetic coating composition free of the components (a) and (b) (Comparative Examples 1, 7 and 9), the magnetic recording media having a magnetic layer formed by the magnetic coating composition free of the component (a) (Comparative Examples 4, 5, 6, 10 and 11), and the magnetic recording media having a magnetic layer formed by the magnetic coating composition free of the component (b) (Comparative Examples 2, 3 and 8) exhibit a less output and a reduced durability in a still mode.

As mentioned above, the magnetic recording medium of the present invention having a magnetic layer formed by a magnetic coating composition containing a curing system made of a binary system, i.e., polyurethane resin obtained by protecting isocyanate groups in an isocyanate-terminated polyurethane prepolymer by an oxime compound and primary amino-containing compound benefits from an excellent dispersibility of magnetic powder and exhibits an excellent durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support and a magnetic layer provided on said support, wherein said magnetic layer is formed by a magnetic coating composition comprising:
   (a) a polyurethane resin obtained by protecting isocyanate groups in an isocyanate-terminated polyurethane prepolymer by an oxime compound;
   (b) a compound containing one or more primary amino groups per molecule;
   (c) a copolymer comprising as a main component a vinyl chloride and containing two or more epoxy groups per molecule; and
   (d) magnetic particles.

2. The magnetic recording medium according to claim 1, wherein said polyurethane resin is a resin containing 2.1 or more oxime protected isocyanate groups on the average per molecule.

3. The magnetic recording medium according to claim 2, wherein the number-average molecular weight of said polyurethane resin is from 500 to 20,000.

4. The magnetic recording medium according to claim 2, wherein said polyurethane resin contains at least one group selected from the group consisting of sulfoxyl group, nitro group, carboxyl group and betaine structure in an amount of 0.3 or more on the average per molecule.

5. The magnetic recording medium according to claim 1, wherein said polyurethane resin is a resin containing 2 or less oxime protected isocyanate groups on the average per molecule.

6. The magnetic recording medium according to claim 5, wherein said polyurethane resin contains at least one group selected from the group consisting of sulfoxyl group, nitro group, carboxyl group and betaine structure in an amount of 0.3 or more on the average per molecule.

7. The magnetic recording medium according to claim 5, wherein the number-average molecular weight of said polyurethane resin is from 1,000 to 30,000.

8. The magnetic recording medium according to claim 1, wherein said polyurethane resin comprises a resin containing 2.1 or more oxime protected isocyanate groups on the average per molecule and a resin containing 2 or less oxime-protected isocyanate groups on the average per molecule.

9. A process of making the magnetic recording medium of claim 1, comprising: coating a support with a composition comprising:
   (a) a polyurethane resin obtained by protecting isocyanate groups in an isocyanate-terminated polyurethane prepolymer by an oxime compound;
   (b) a compound containing one or more primary amino groups per molecule;
   (c) a copolymer comprising as a main component a vinyl chloride and containing two or more epoxy groups per molecule; and
   (d) magnetic particles; and
curing said coated support.

10. The method according to claim 9, wherein said polyurethane resin is a resin containing 2.1 or more oxime protected isocyanate groups on the average per molecule.

11. The method according to claim 10, wherein the number-average molecular weight of said polyurethane resin is from 500 to 20,000.

12. The method according to claim 9, wherein said polyurethane resin is a resin containing 2 or less oxime protected isocyanate groups on the average per molecule.

13. The method according to claim 12, wherein said polyurethane resin contains at least one group selected from the group consisting of sulfoxyl group, nitro group, carboxyl group and betaine structure in an amount of 0.3 or more on the average per molecule.

14. The method according to claim 12, wherein the number-average molecular weight of said polyurethane resin is from 1,000 to 30,000.

* * * * *

UNITED STATES PATENT AND TRADEMARK OFFICE
CERTIFICATE OF CORRECTION

PATENT NO. : 5,718,978
DATED : February 17, 1998
INVENTOR(S) : Kazutaka YAMASHITA et al.

It is certified that error appears in the above-identified patent and that said Letters Patent is hereby corrected as shown below:

On the title page, Item [54] and at the top of column 1:

...POLURETHANE... should read   --POLYURETHANE--

Signed and Sealed this

Twenty-eighth Day of April, 1998

Attest:

BRUCE LEHMAN

Attesting Officer        Commissioner of Patents and Trademarks